US008744903B2

(12) United States Patent
Waguet et al.

(10) Patent No.: US 8,744,903 B2
(45) Date of Patent: Jun. 3, 2014

(54) EVENT RESOLUTION

(75) Inventors: Cyrille Waguet, St. Leon-Rot (DE);
Sabine Holz, Weinheim (DE); Annette Jann, Heidelberg (DE)

(73) Assignee: SAP AG, Walldorf (DE)

( * ) Notice: Subject to any disclaimer, the term of this patent is extended or adjusted under 35 U.S.C. 154(b) by 1035 days.

(21) Appl. No.: 12/111,588

(22) Filed: Apr. 29, 2008

(65) Prior Publication Data

US 2009/0271232 A1   Oct. 29, 2009

(51) Int. Cl.
G06Q 10/00   (2012.01)
G06N 5/02   (2006.01)
G06Q 10/06   (2012.01)
G06N 5/04   (2006.01)

(52) U.S. Cl.
CPC .............. *G06Q 10/0637* (2013.01); *G06N 5/04* (2013.01); *G06N 5/045* (2013.01)
USPC ................................ 705/7.36; 706/47; 706/49

(58) Field of Classification Search
CPC ..... G06Q 10/0637; G06N 5/04; G06N 5/041; G06N 5/042; G06N 5/043; G06N 5/045; G06N 5/046; G06N 5/047; G06N 5/048; G05B 13/028; G05B 13/0265
USPC ........................................ 705/7.36; 706/45, 47
See application file for complete search history.

(56) References Cited

U.S. PATENT DOCUMENTS

| | | | | |
|---|---|---|---|---|
| 5,351,247 A * | 9/1994 | Dow et al. | | 714/26 |
| 6,012,056 A * | 1/2000 | Menlove | | 1/1 |
| 6,081,798 A * | 6/2000 | Johnson et al. | | 706/54 |
| 6,212,528 B1 * | 4/2001 | Brophy et al. | | 1/1 |
| 6,263,333 B1 * | 7/2001 | Houchin et al. | | 1/1 |
| 6,571,251 B1 * | 5/2003 | Koski et al. | | 1/1 |
| 6,571,285 B1 * | 5/2003 | Groath et al. | | 709/223 |
| 6,742,141 B1 * | 5/2004 | Miller | | 714/26 |
| 6,760,722 B1 * | 7/2004 | Raghunandan | | 1/1 |
| 7,080,141 B1 * | 7/2006 | Baekelmans et al. | | 709/224 |
| 7,379,846 B1 * | 5/2008 | Williams et al. | | 702/185 |
| 2003/0187707 A1 * | 10/2003 | Hack et al. | | 705/7 |
| 2004/0083191 A1 * | 4/2004 | Ronnewinkel et al. | | 706/20 |
| 2004/0083213 A1 * | 4/2004 | Wu et al. | | 707/4 |
| 2004/0133457 A1 * | 7/2004 | Sadiq et al. | | 705/7 |

(Continued)

OTHER PUBLICATIONS

Jarmulak, "Self-Optimising CBR Retrieval," 2000, Proceedings of the 12th IEEE International Conference on Tools with Artificial Intelligence, ICTAI 2000, pp. 376-383.*

(Continued)

*Primary Examiner* — Justin M Pats
*Assistant Examiner* — Ivan R Goldberg
(74) *Attorney, Agent, or Firm* — Schwegman, Lundberg & Woessner, P.A.

(57) ABSTRACT

Apparatus, systems, and methods that operate to assist in resolving both expected and unexpected events that occur in the course of business operations are disclosed. Activities may include detecting the occurrence of an alert event, determining whether the alert event is an expected event or an unexpected event, presenting a resolution sequence for the expected event, and soliciting a new event resolution path for the unexpected event. Further activities may include determining an alert event is an unexpected event, displaying an alert message associated with the unexpected event, and soliciting recommendations to form a new event resolution path to be presented upon determining a new event has occurred that is similar to the alert event. Additional apparatus, systems, and methods are disclosed.

21 Claims, 8 Drawing Sheets

(56) References Cited

U.S. PATENT DOCUMENTS

| | | | |
|---|---|---|---|
| 2004/0237077 A1* | 11/2004 | Cole et al. | 717/162 |
| 2005/0033491 A1* | 2/2005 | Gross et al. | 701/33 |
| 2005/0182835 A1* | 8/2005 | Goldberg et al. | 709/224 |
| 2005/0193002 A1* | 9/2005 | Souders et al. | 707/103 X |
| 2005/0198556 A1* | 9/2005 | Tripp et al. | 714/726 |
| 2006/0095392 A1* | 5/2006 | Arend | 706/45 |
| 2006/0111921 A1* | 5/2006 | Chang et al. | 705/10 |
| 2006/0143034 A1* | 6/2006 | Rothermel et al. | 705/1 |
| 2007/0083872 A1* | 4/2007 | Doshi | 719/318 |
| 2007/0094217 A1* | 4/2007 | Ronnewinkel | 706/52 |
| 2007/0112609 A1* | 5/2007 | Howard et al. | 705/8 |
| 2008/0065449 A1* | 3/2008 | Blagg et al. | 705/8 |
| 2008/0077609 A1* | 3/2008 | Ronen | 707/102 |
| 2008/0091727 A1* | 4/2008 | Wynett et al. | 707/104.1 |
| 2008/0162208 A1* | 7/2008 | Waguet | 705/7 |
| 2008/0172574 A1* | 7/2008 | Fisher | 714/25 |
| 2008/0263404 A1* | 10/2008 | Vidiyala | 714/38 |

OTHER PUBLICATIONS

Yang, "Integration of ART-Kohonen neural network and case-based reasoning for intelligent fault diagnosis," 2004, Expert Systems with Applications, vol. 26, No. 3, pp. 387-395.*

* cited by examiner

EVENT RESOLUTION

BACKGROUND

Workers often encounter a bewildering amount of information in the performance of their daily tasks. Business objects on their desktop are rarely organized or correlated in any kind of logical manner. For example, a sales order for an item may be processed using one type of form or software package, while inventory control for the same item may be handled by another. Even if an object can be processed by a variety of applications, the context and rendering are normally inconsistent, without any provision for collaboration. This is the set of circumstances experienced by workers when expected events occur during the normal course of business. Typically, they rely on their own past experience to deal with such events.

These difficulties are magnified when unexpected events occur. Contextual data, pattern detection, and recommendations for dealing with such events are usually absent, such that workers are often left entirely on their own in difficult situations. Thus, workers often have few or no tools available to deal with the occurrence of both expected and unexpected events.

DETAILED DESCRIPTION

Figure 1:
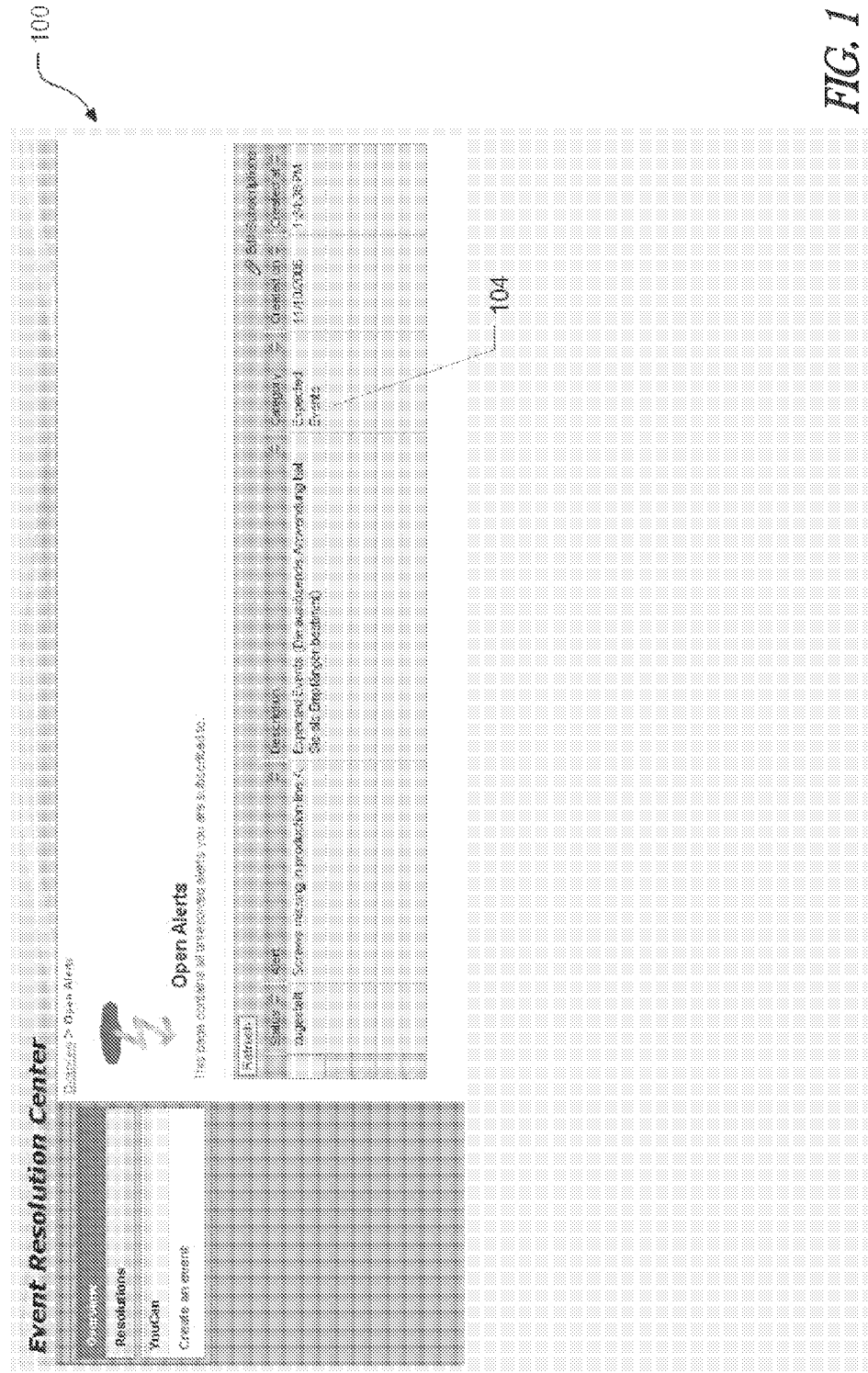
FIG. 1 illustrates an example graphical user interface (GUI) indicating the presence of an expected alert event according to various embodiments of the invention.

The inventors have discovered that the challenges noted above, as well as others, can be addressed by implementing an event resolution mechanism that allows handling both expected and unexpected events in a more efficient manner. It provides end users with a set of tools and applications, assisting them with proposals and best practices relevant to resolving specific events.

Event resolution as described herein provides well-defined solutions for resolving expected events (e.g., system alerts, parts shortages, power outage, etc.). Flexible design permits changes to be implemented as part of the resolution process.

Even resolution as described herein also makes it possible to respond to unexpected events (e.g., broken machines, accidental loss, etc.) consistently, with more predictable results. Events are harmonized, and requests for solutions are made. Information, services, and experts are provided, based on the context of an event. The context can be manually and/or automatically enriched as the event occurrence is resolved. Knowledge sharing among workers is facilitated, and best practices are made available to untrained colleagues.

For the purposes of this document, a "desktop" comprises a GUI that displays icons representing programs, folders, files, and various types of electronic content (e.g., documents, letters, reports, pictures). The icons on an electronic desktop can be manipulated in the same way as real objects on a real desktop—by moving them around, putting one on top of another, reshuffling them, and throwing them away.

An "end user" or "worker" is a human being that makes use of a desktop to resolve events. The terms end user and worker can be used interchangeably throughout this document.

"Events" can be created automatically or manually. Thus, an event represents an abstraction of a trigger originating from a system or from an end-user that manually designates the occurrence of a particular set of circumstances as an event. An "alert event" is an event that has risen to the level at which the event resolution process is initiated. This level may be selected as an amount that exceeds a predetermined value, as the appearance of a member of a correlated series of events, and in other ways.

An "expected event" has a defined resolution path that has been designated as such. An "unexpected event" does not have a defined resolution path.

A "resource" comprises a web page, a file on a disk, or any manifestation of information inside a computer system. Other examples of resources include address book items, database entries, and calendar appointments.

In various embodiments, an assistant, a recommender, and a database interact to help workers resolve both expected and unexpected events. These three components will now be described.

The assistant manages the context of event resolution by harmonizing different object models (resources), correlating various representations of the same business objects (e.g., a sales order in a supplier's database might be represented in the same way as a sales order in a customer relations management (CRM) activity). Thus, object views are used to render objects of different types consistently, in a substantially generic way. Object actions can be used to work on these objects for collaboration (e.g., sending a document to an expert).

This context management functionality is made available in a user interface (UI) component called the "assistant," which operates to provide the end user or worker with additional functionality when searching for objects, searching in contexts (e.g. "give me all sales orders from this process or this application"), or working with application via application interfaces (APIs) or business clients (e.g., via tagging). The search functionality of the assistant includes intelligent search mechanisms like result ranking (e.g., placing first in a list of resolution activities the approach to resolution that makes the most sense in the current context) and selecting groups of search items based on the context.

The recommender (i.e., recommendation service) is responsible for intelligent recording of end user interaction so that the meaning and the goal of the interaction can be derived. This data is recorded based on work context data and worker actions received via a GUI. The recommender receives end user ratings of context items and actions that have been performed to optimize recommendations in future. Based on the recorded data, recommendations (e.g., the next action to be performed) can be made to the end user according to the current context data and actions that have already been performed, compared to historical data weighted with end-user ratings. This use of case-based reasoning allows end users to move from an unstructured work approach (e.g., ad hoc application execution) to a structured process, so that direction is received as to which actions should be executed, in a sequence that applies to the specific situation. Thus, work patterns and best practices can be generated from historical data to optimize the process of event resolution.

The data base is used for learning and optimizing task and event-based work. Logging functionality provides a data base for process and task pattern recognition. The data base is used in addition to the recommender to provide the end user with help in optimizing work on business processes, preventing mistakes that have occurred in the past, and avoiding actions that are known to generate backlog situations.

Using the recommender and the data base, a user can smoothly switch between working on predefined processes, best practices, and ad hoc resolution in an unstructured collaborative mode. The boundaries between these different types of applications are dissolved when the event resolution mechanisms described herein are used.

Events to be resolved may be classified as expected events or unexpected events. A context contains the event, actions, items, and cases used during event resolution.

Actions may be viewed in a variety of ways. From the user interface point of view, an action may be understood as the execution of a service, causing some change in the state of the back-end system (e.g., a process, business object, etc.), which leads to a visible change in the work environment presented to end users as part of the user interface. From the conceptual point of view, an action may be understood as one activity in a process, or a series of activities that make up a transaction. Every action is therefore associated with a particular use case, and a particular application. From the implementation point of view, an action is a class that implements a certain interface (making it an action), and published in an action gallery that is invoked externally by some client. Actions expose their interface (input/output) as well as their possible result states. Actions leveraged in event resolution are typically "user interface actions"—actions that can be viewed and executed from a user interface—since that is what makes sense to end users.

End users get access to actions in different ways. The first way is through objects that expose certain actions to the user interface. For example a "SALES ORDER" object might expose a variety of operations, such as "DISPLAY", "FORWARD", "EDIT" or "RELEASE". Through the "EDIT" or "RELEASE" operations a user can change the data and state of the object. These operations are bound to actions. The "DISPLAY" operation, as a matter of contrast, is only an informative operation.

Another way for end users to access and use actions is to search for those actions that are relevant to the event they are in the process of resolving, and then to add the search results to the work context. Those actions are then available as items in the context and expose themselves using operations such as "DISPLAY", "FORWARD" or "EXECUTE". For example, "EXECUTE" might be the default operation that is started when the user clicks on the action object displayed in the event resolution user interface. The "EXECUTE" operation might be part of a "CREATE CUSTOMER" action that can be executed by the end user. Some actions receive input parameters and some do not. For example, the "CREATE CUS-TOMER" action might be launched standalone, whereas the "EDIT CUSTOMER" action might receive data that include a "CUSTOMER ID".

Operations are services available as a standalone entity (e.g., an entity that can be referenced from a context), or with reference to certain entities that form a part of the business context.

If an end user is occupied with resolving an event, it may happen that no further recommendations are presented, and no clear path to resolution can be viewed. In this case, more information is useful to guide subsequent activity.

A database of stored data can provide object-based information from a variety of systems and transform them to resources. Each resource instance conforms to a resource type definition and may be stored in the context if desired.

The recommender operates to recommend appropriate actions within the current context to the end user. The end user may choose one of the recommended actions, adjust the scope of recommended actions, or simply ignore the recommendations. When the event is resolved, the user may also rate the actions selected within the resolution context. Recommendations added to the context create enriched context that is available to the recommender when future alert events are to be resolved.

Appropriate actions to implement might be those that have been proven useful when applied in a comparable situation, or case (comprising multiple information entities). Each information entity in a case is an atomic piece of information describing a part of the situation. An information entity comprises a particular type, a value, and a similarity criterion (possibly defined using one or more parameters). Information entity values can be used to search for comparable situations. Since information entities may have different levels of importance, the user may assign relevance in order to emphasize some information entities over others. Here the assigned relevance and similarities form a mechanism for comparison between the information entities and the cases.

To enhance the value of comparing information entities, the recommender can process data to provide recommendations. For example, a previously stored context can be parsed for similarities and information entities to find relevant attributes (in terms of the comparisons between different contexts). Using relevance and similarities, appropriate actions (recommendations) will be identified. These can be added to the context, and the context returned to the end user.

The relevance of information entities within the current case can be updated, and used for the generation of recommendations. A case is a comparable situation from the past, and an information entity is a certain type of attribute used to compute the similarity between cases. The end user can be given the ability to rate certain information entities in terms of their relevance within the comparison. After the update is finished, a Generate Recommendations action can be invoked in order to generate new recommendations using updated relevance information. All performed actions can be rated, and used by the recommender at a future time. Pairs of actions and ratings can be stored.

FIG. 1 illustrates an example GUI 100 indicating the presence of an expected alert event 104 according to various embodiments of the invention. Here the GUI 104 presents the end user with a list of open alerts, including the alert event 104 that is an expected event. In this case, the event is characterized as "screws missing in production line". Thus, at some point, an end user designated this type of even as one that would be expected to occur, and which has a defined resolution path. Alert events may appear as part of a window in a GUI 100, as shown in FIG. 1, as part of an email message, in a pop-up window, in a side-bar window, and in other ways.

Figure 2:
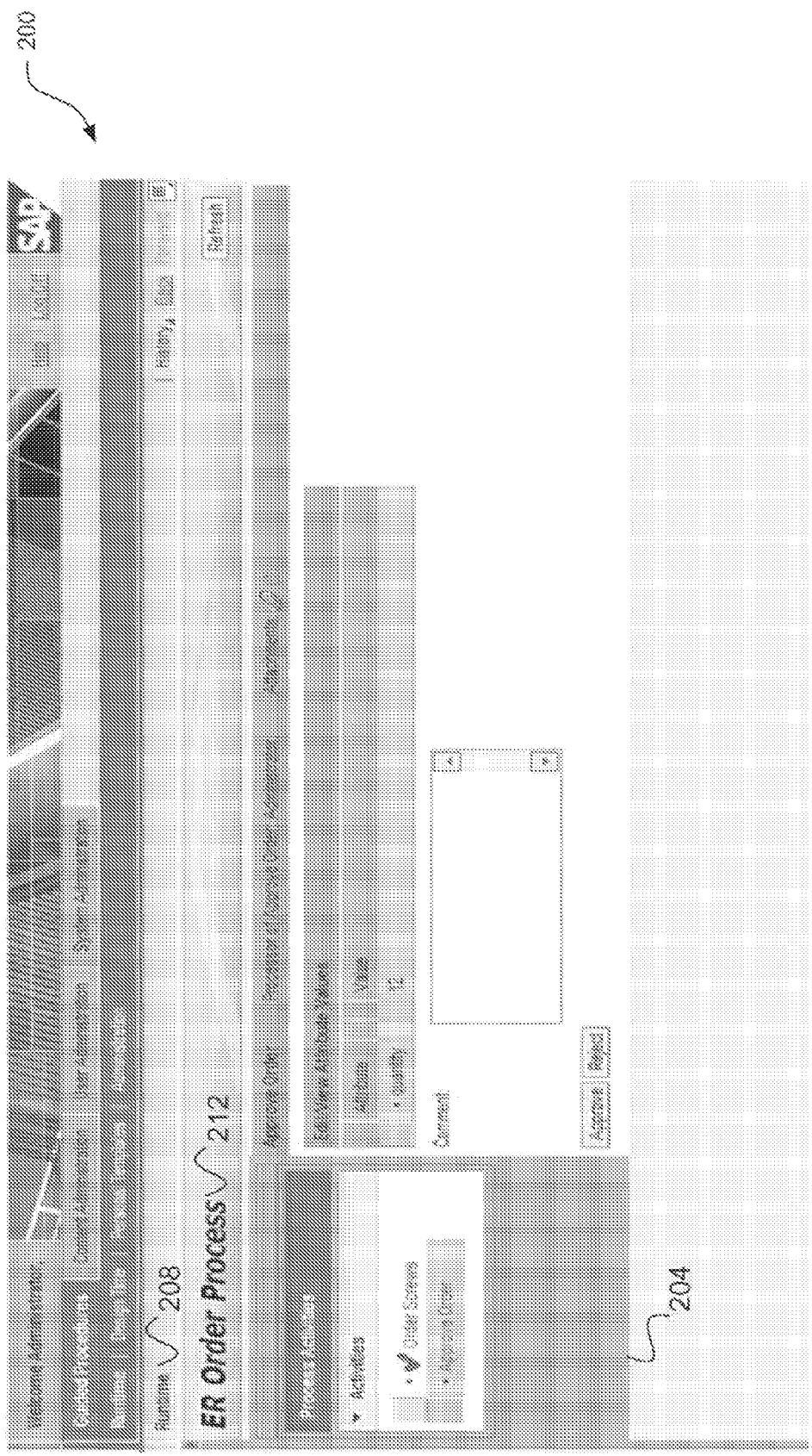
FIG. 2 illustrates an example GUI presenting a resolution sequence for the expected alert event of FIG. 1, according to various embodiments of the invention.

FIG. 2 illustrates an example GUI 200 presenting a resolution sequence 204 for the expected alert event of FIG. 1, according to various embodiments of the invention. Here the resolution sequence includes a series of procedures that comprise "order screws" and "approve order". These procedures or process activities make up the known resolution path or sequence 204 in the runtime guided procedure 208 for an Order Process 212 that is used to resolve the expected event of "screws missing in production line" noted in FIG. 1.

Figure 3:
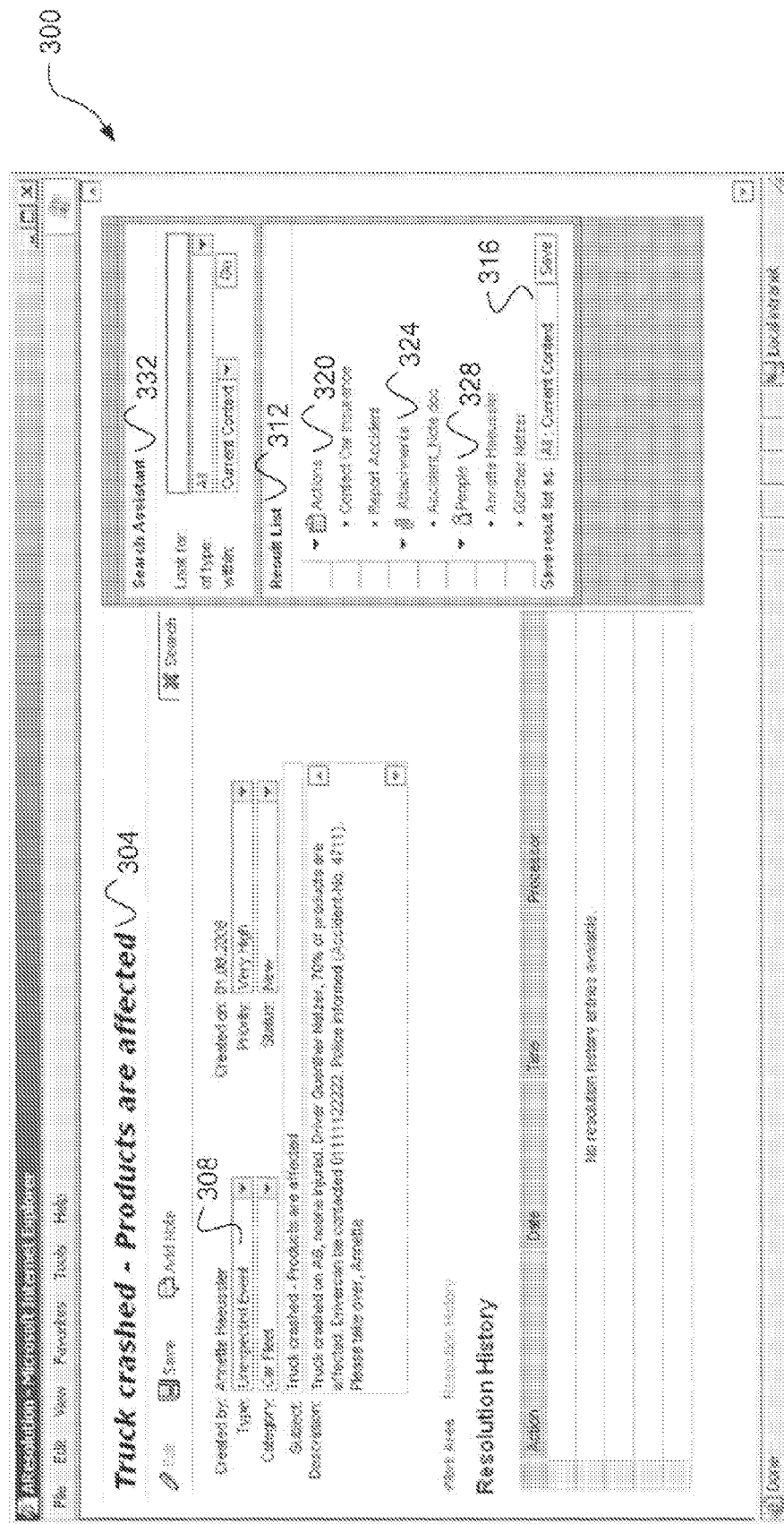
FIG. 3 illustrates an example GUI indicating the presence of an unexpected alert event according to various embodiments of the invention.

FIG. 3 illustrates an example GUI 300 indicating the presence of an unexpected alert event 308 according to various embodiments of the invention. In this case, there is no defined resolution path for the specific event 304 of "Truck crashed— Products are affected." As can be seen from the Description in the figure, the crash event 304 resulted in 70% of products being affected.

The event 304 was created by "Annette Haeussler" and this person is thus listed as part of the result list 312 forming the current context 316. The actions 320 taken up to this point in time, such as contacting the car insurance company and reporting the accident, also form a part of the context 316. Similarly, any related electronic content 324 attached to the resolution of the event, and the persons 328 to be contacted as the unexpected event 308 undergoes resolution are also made part of the context 316, which can be saved as new items appear in the result list 312. The search assistant 332 can be used to find specific items in the context 316, as desired.

Figure 4:
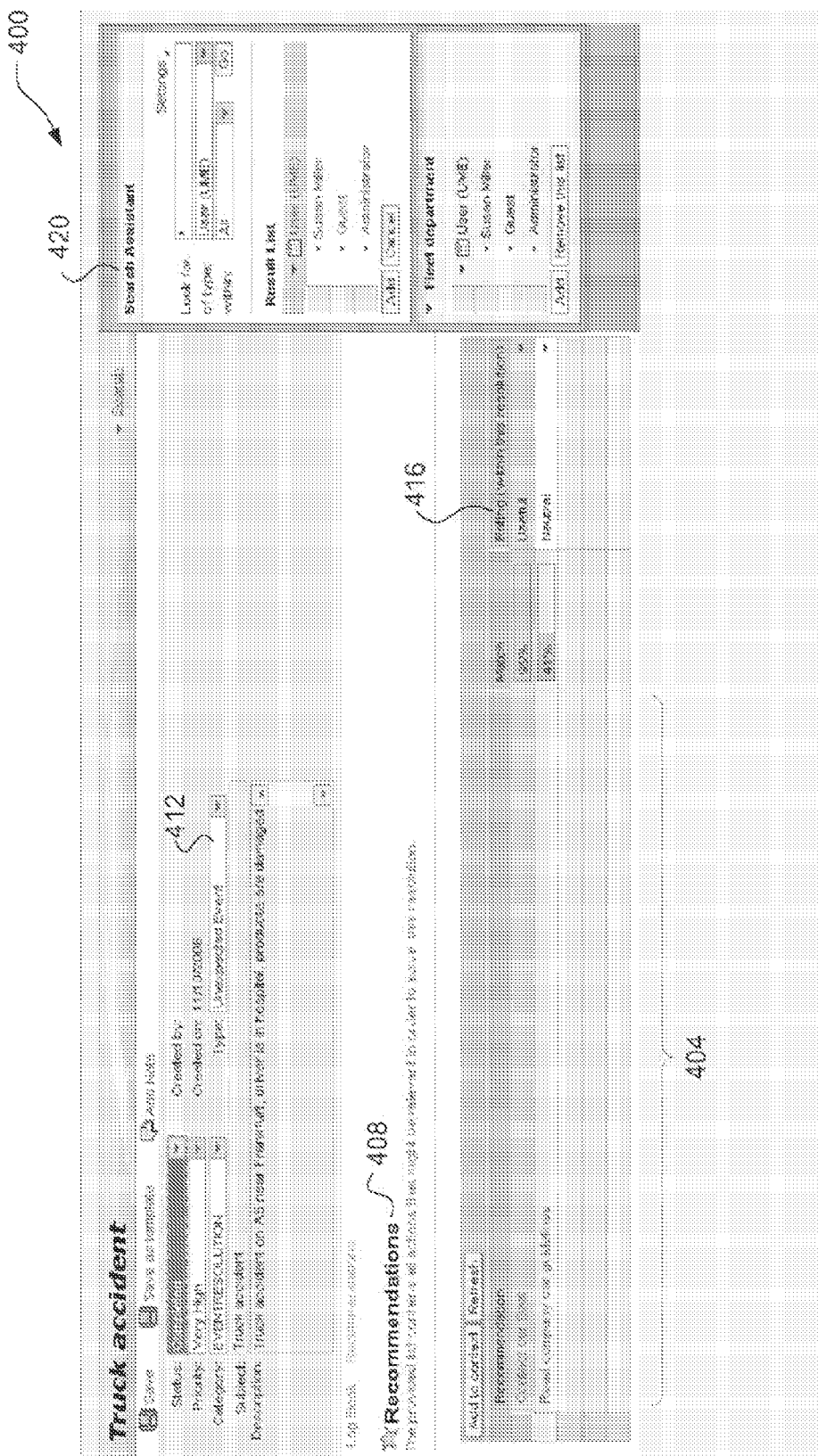
FIG. 4 illustrates an example GUI presenting a potential new resolution path for the unexpected alert event of FIG. 3, according to various embodiments of the invention.

FIG. 4 illustrates an example GUI 400 presenting a potential new resolution path 404 for the unexpected alert event of FIG. 3, according to various embodiments of the invention. Recommendations 408 are provided by the recommender, based on the context. In this case, the recommender has compared the context of the unexpected event 412 with other contexts in the database, and the two recommendations "contact car fleet" and "read company car guidelines" are presented in a ranked order, based on the degree of matching the information in the present context with the information contained in other (prior) contexts. A rating 416 as to the usefulness of each recommendation forming a part of the recommendations 408 presented by the recommender may be entered by the end users during the resolution process— which adds further information to the context.

The search assistant 420 can help the end user locate a variety of resources, including business intelligence, emergency assistance, the identity of experts and personnel, and other data that may be useful to efficiently resolve the unexpected event. The search assistant 420 can also locate persons that are members of groups that may be involved in the resolution of events. These search results can be added to the list of recommendations 408, improving the breadth of knowledge available for resolving unexpected events in the future. Thus, many embodiments may be realized.

Figure 5:
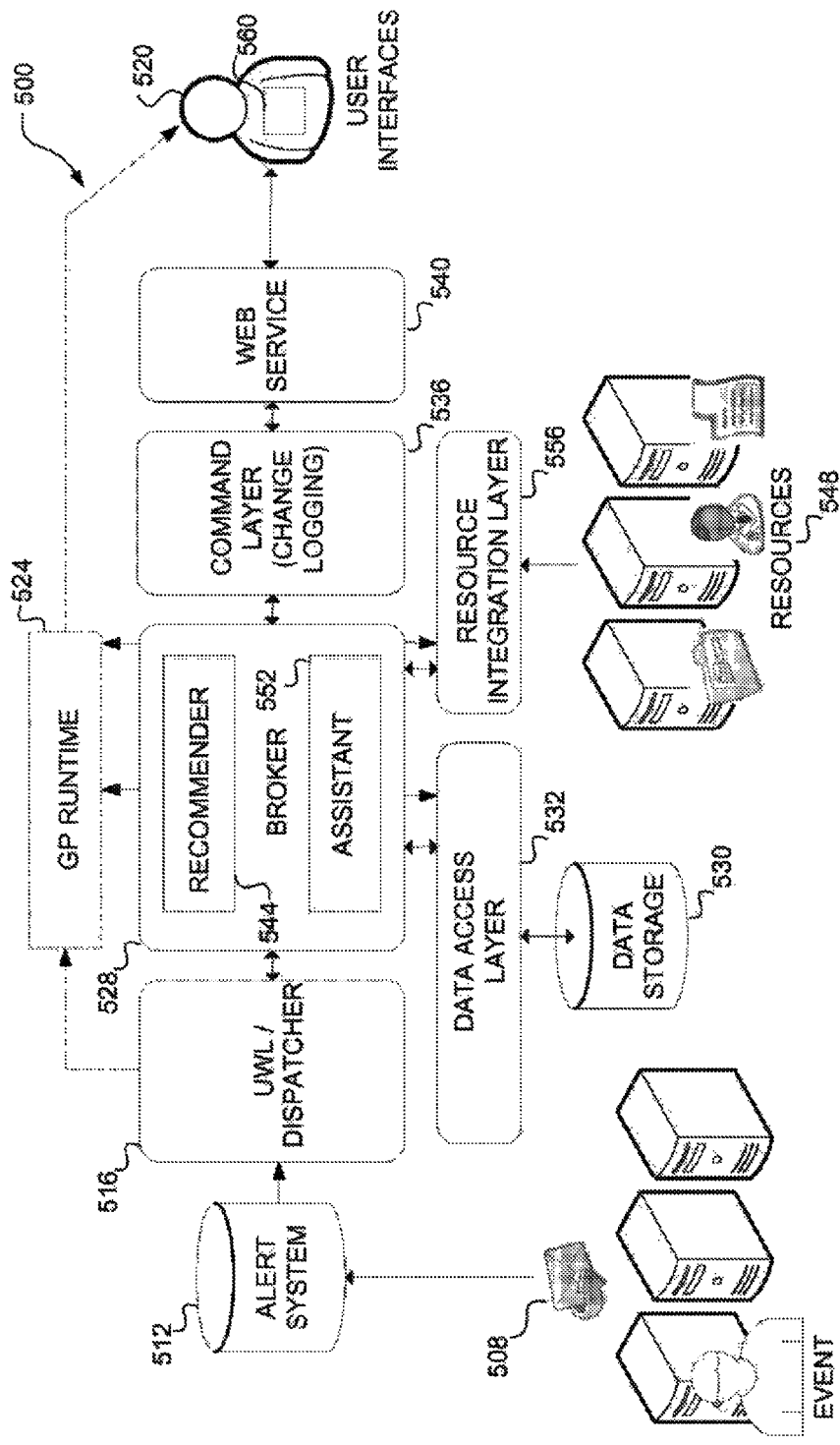
FIG. 5 is a block diagram of a system to implement event resolution according to various embodiments of the invention.

For example, FIG. 5 is a block diagram of a system 500 to implement event resolution according to various embodiments of the invention. In some embodiments, the system 500 includes an event provider 504, an alert system 512, and a UWL/dispatcher module 516.

The event provider 504 provides events 508 to the system 500. The alert system 512 processes events 508 and determines whether individual events 508 rises to the level of an alert event (e.g., an event that has passed a threshold level of significance).

Different alert types, or categories of alerts, are assigned to specific users by the UWL/dispatcher module 516, and when these categories of events rise to the level of an alert event, they are dispatched to the appropriate end users via the user interface 520. The examination of events 508 is rule-based. Rules can determine whether an event 508 has risen to the level of an alert event, and also, whether an event 508 constitutes an expected event (e.g., the event 508 has been previously associated with a guided procedure that has been explicitly modeled in the system), or an unexpected event (e.g., no guided procedure for that event has been modeled, and been designated as such, even though the same event may have occurred in the past, and been addressed with a variety of recommended activities).

For example, a key performance indicator (KPI) event may be monitored as a specific instance of an alert category by the alert system 512 to determine if a threshold has been reached. Thus, if the number of first-gear check valves in an automobile transmission assembly line (the check valve is an instance of the category "parts") has dropped below a desired level that will keep the line supplied until the next shipment of parts arrives, an alert event will be generated by the alert system 512, and dispatched to the appropriate user(s) by the dispatcher 516. This type of event would be determined to be an expected event if a guided procedure or resolution path has been previously established.

The guided procedure (GP) runtime module 524 is used when events 508, in the form of expected events, are presented by the alert system 512. Here, a set of procedures is used to resolve a known event. For example, when the level of stock in a store has fallen to a low amount, one that may not last until the next re-supply operation, the set of procedures involved may include filling out a rush order to replenish the stock, having the order approved, and sending the order to the supplier with a request for immediate attention and shipment.

For events 508 that appear as unexpected events, other modules come into action. The broker module 528 maintains the relationship between the alert instance (i.e., the alert event) and the resolution context, which contains all the information needed for an end user to resolve the event. The resolution context is dynamic, so that the end user can view the alert event, and can enhance the context.

New information can be added to the context, as a part of search results presented to the end user by the assistant 552 in the broker module 528. As noted previously, the assistant 552 manages the context of event resolution by harmonizing different object models (resources 548), and correlating various representations of the same business objects taken from data storage 530 via the data access layer 532. In this way, objects of different types can be rendered to the end user in a consistent manner.

The command layer module 536 presents commands, such as search commands, to the web services module 540 to locate information that is related to the current alert event. Commands include adding new actions to the context, and retrieving recommended actions from the context. The command layer module 536 monitors end user actions within the context, via the user interface 520, and the recommender module 544 is used to make recommendations to the end user in accordance with the context and the end user actions. In this way, an end user can work on resolving an alert event, close the window of the user interface 520, and return at a later time to the same context. The dispatcher 516 maintains the context.

Resources 548 comprise information that can be made available from the context. The presence of resources 548 as part of an alert event can be used to identify relevant prior contexts. Thus, prior contexts that reference a particular stock item mentioned in an alert event can, for example, be automatically retrieved by the recommender module 544—the recommender module 544 analyzes the current alert event and operates to find similar contexts, if possible. If such information is not available in the context, the end user can search for related information and add it to the context directly, using the assistant 552. The assistant 552 operates via the resource integration layer 556, which is used to present resources 548 in a consistent manner to the broker module 528. Thus, many embodiments can be realized.

For example, a system 500 may comprise an alert system 512 to detect the occurrence of an event 508, such as an alert event, and a dispatcher 516 to determine whether the alert event is an expected event or an unexpected event. The system 500 may also comprise a guided procedure module 524 to present a resolution sequence for the expected event, and a broker module 528 to maintain a relationship between the alert event 508 and a new event resolution path as a context for resolving the unexpected event.

In most embodiments, the system 500 comprises a display 560, perhaps as part of a user interface 520, to display a pre-existing series of actions to resolve the expected event as part of the guided procedure. The display 560 may also be used to dynamically display the new event resolution path as recommended actions are selected from search results and added to the (new) event resolution path.

The broker module 528 may comprise an assistant module 552 to search business intelligence and to provide potential recommendations proposed as part of the new event resolution path. The broker module 528 may also comprise a recommender module 544 to record user interactions related to recommendations selected to form part of a new event resolution path. In some embodiments, the system 500 may include a resource integration layer 556 to access stored information, such as resources 548, including a model of a guided procedure assigned for use when a particular expected event is to be resolved. Still further embodiments may be realized.

Figure 6:
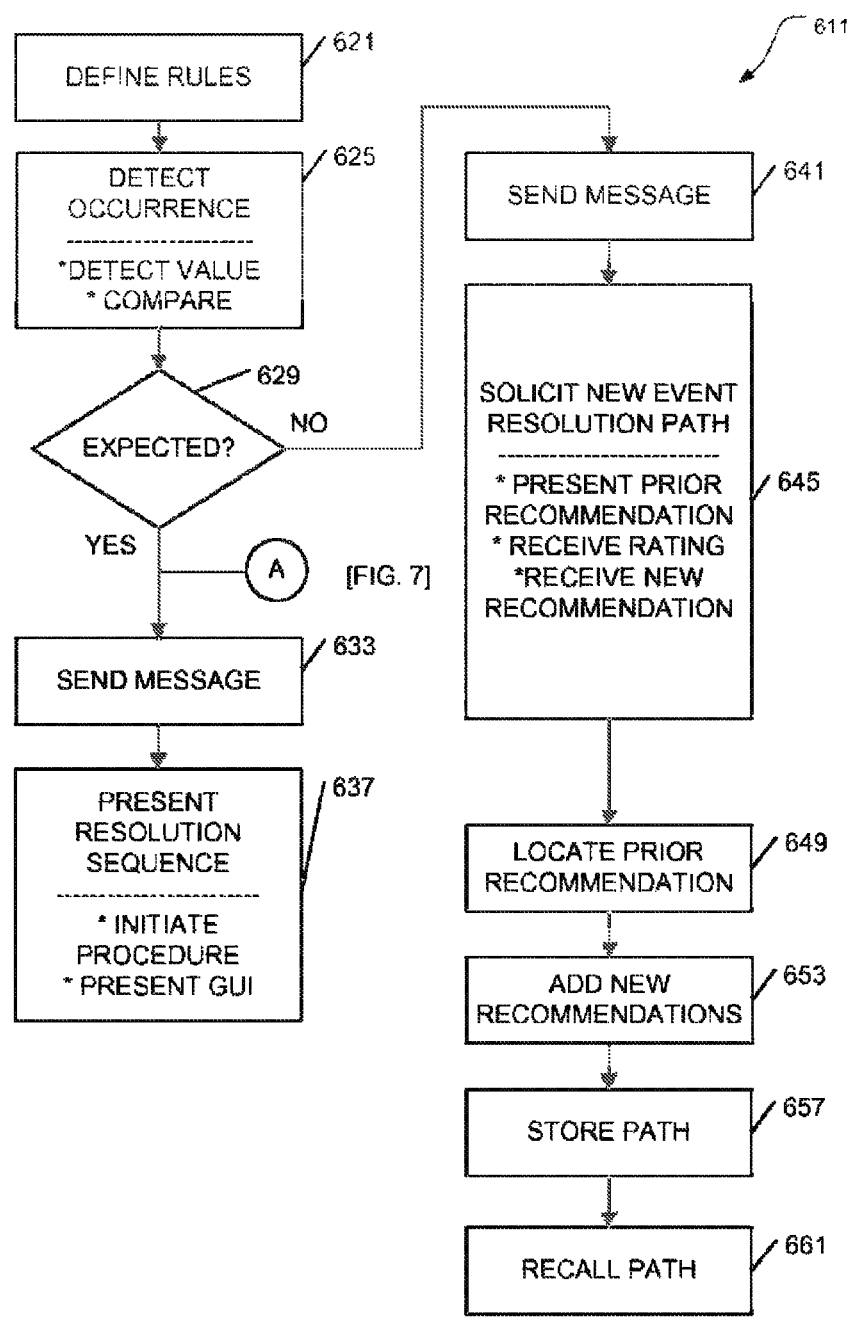
FIG. 6 is a flow diagram illustrating methods of event resolution according to various embodiments of the invention.

For example, FIG. 6 is a flow diagram illustrating methods 611 of event resolution according to various embodiments of the invention. The methods 611 are implemented in a machine-accessible and readable medium, and are operational over processes within and among networks. The networks may be wired, wireless, or a combination of wired and wireless. The methods 611 may be implemented as instructions, which when accessed by a machine, perform the processing depicted in FIGS. 1-5. Given this context, event resolution is now discussed with reference to FIG. 6.

In some embodiments, a computer implemented method 611 to assist in resolving events begins (optionally) at block 621 with defining one or more rules to handle expected events. Any of the rules may includes a valid time period and a process to be initiated as part of presenting a resolution sequence.

The method 611 may continue on to block 625 with detecting occurrence of an alert event. Detecting the occurrence of an alert event may include detecting the value of a received event and comparing the value to a pre-selected alert threshold value, comparing the received event to one of a correlated series of events, or both. For example, correlating a series of events, such as planning for production, might be used to designate a shortage of materials in the future as an (expected) alert event. Any combination of threshold values and event correlation can be used to determine whether a specific event should be designated as an alert event to be resolved.

Thus, an alert event may be detected by determining that a received event has crossed a threshold value for an event type matching the event type of the alert event, or by determining that the received event supports a correlated series of events, or both. The event may support a correlated series of events by forming part of the series, or by affecting other events in the series. Thus, a number of unclassified events may be received, but only those that satisfy specific conditions are classified as alert events, which are used to trigger the generation of an alert, and subsequent event resolution activity.

The method 611 may continue at block 629 with determining whether the alert event is an expected event or an unexpected event. This determination may include determining the existence of a guided procedure corresponding to an expected event, since an alert event is classified as an expected event if a guided procedure for that event has been modeled and stored in the system. Any solution that guides users in resolving the event in a deterministic way, and has been designated as such, can be considered as a guided procedure.

If the alert event is classified as an expected event at block 629, the method 611 may include sending an alert message to alerted users assigned to the alert type at block 633, so that selected users can be alerted based on that alert type (e.g., expected events, or a refined version of the event that is specific to a particular type of expected event, such as a stock shortage event, or an absent personnel event).

The method 611 may continue on to block 637 with presenting a resolution sequence for the expected event. This may comprise, in turn, initiating the resolution sequence as a previously-stored guided procedure. The activity at block 637 may also comprise presenting the resolution sequence as part of a GUI, including an interactive GUI.

If it is determined that the alert even is not an expected event at block 629, then the method 611 may continue on to block 641 with sending an alert message to alerted users assigned to that alert type (e.g., unexpected events, or a refined version of the event that is specific to a particular type of unexpected event, such as a motorcycle accident event, or an automobile accident event), so that selected users are alerted based on the alert type.

The method 611 may continue on to block 645 to include soliciting a new event resolution path for the unexpected event, perhaps as part of a GUI, including an interactive GUI. Thus, once an alert event has been passed into the system, and the alert event is determined to be an expected event or an unexpected event, presentation of a resolution sequence, or solicitation of a new event resolution path proceeds accordingly.

Soliciting the new event resolution path at block 645 may comprise presenting one or more prior recommendation associated with similar prior events, and receiving ratings for the prior recommendations in accordance with the alert event. That is, for an unexpected event, prior recommendations for similar events are presented, and ratings in accordance with the current context can be received from the end user that is involved with resolving the event. Of course, such prior recommendations are presented only if they are available. It is possible that nothing like the current event has been seen before, in which case no prior recommendations will exist.

As it is possible that no prior recommendations exist, or that prior recommendations provide an incomplete solution, or a solution that is less than satisfactory, soliciting the new event resolution path at block 645 may comprise receiving, from a user notified of the alert event, new recommendations to resolve the alert event. Thus, in some embodiments, the method 611 may continue on to block 649 with locating at least one prior recommendation associated with a similar prior event, and adding a new recommendation received from a user notified of the alert event to the at least one prior recommendation to form a portion of the new event resolution path at block 653.

In this way, prior recommendations and new recommendations can be combined to form the new event resolution path. That is, the actual resolution path is selected by the end users working on resolution of the event. Recommendations may be available for end users to select what they want to do, such as to execute available recommendations or search for other actions that can be added to recommendations bound to similar situations.

The method 611 may go on to block 657 to include storing the new event resolution path, and recalling the new event resolution path upon determining that a new event is similar to the alert event at block 661. Thus, it can be seen that the new event resolution path is dynamic. It can be stored for later recall, based on receiving an alert event that has a context which is similar to the context generated by prior alert events.

Figure 7:
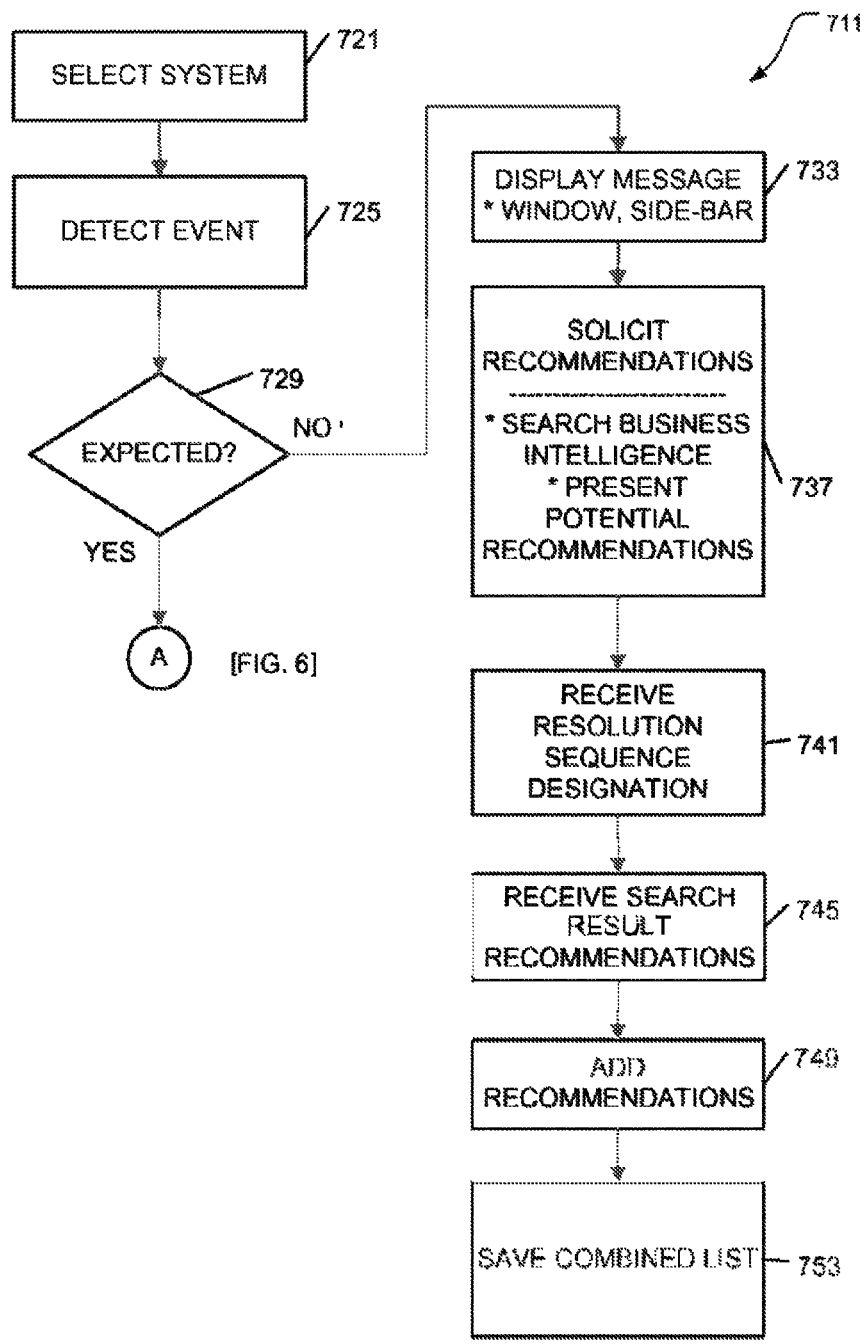
FIG. 7 is a flow diagram illustrating methods of building a new event resolution path according to various embodiments of the invention.

FIG. 7 is a flow diagram illustrating methods 711 of building a new event resolution path according to various embodiments of the invention. The methods 711 are implemented in a machine-accessible and readable medium, and are operational over processes within and among networks. The networks may be wired, wireless, or a combination of wired and wireless. The methods 711 may be implemented as instructions, which when accessed by a machine, perform the processing depicted in FIGS. 1-6. Given this context, building an event resolution path is now discussed with reference to FIG. 7.

A computer implemented method 711 of building an event resolution path may comprise selecting a system to provide the alert event at block 721. Thus, end users can choose which systems will serve as event providers within their own work environment. The method 711 may continue on to block 725 with detecting the occurrence of an alert event, as described previously.

The method 711 may then continue on to block 729 to determine whether an alert event is an expected event, or an unexpected event. Determining that the alert event is an unexpected event may comprise failing to locate a pre-existing resolution sequence corresponding to the detected alert event.

In some embodiments, the method 711 includes displaying an alert message associated with the unexpected event at block 733. This activity may include one or more of displaying a web page window or a sidebar window as part of a GUI. Of course, the alert message may be communicated in many other ways, some of which have been described previously.

The method 711 may continue on to block 737 with soliciting recommendations to form a new event resolution path for presentation (e.g., in the future) upon determining that a new event has occurred which is similar to the current alert event. In this way, after an alert message announces the occurrence of an unexpected event, recommendations to build a resolution path for future use can be solicited.

Soliciting recommendations at block 737 may include searching business intelligence reports to prepare a list of potential recommendations. Soliciting recommendations at block 737 may also include presenting potential recommendations as a ranked list of prior recommendations associated with a prior event determined to be similar to the alert event in terms of at least one of an event type or an event context. Of course, both approaches may be combined.

Thus, prior recommendations can be listed in order of rank. The similarity of two events can be calculated according to the event type or/and the information attached to the event (e.g., the event context, such as the identity of a customer that is involved, a product, or any other kind of information). Event similarity may be determined as a combined score of such factors, as is known to those of ordinary skill in the art.

In some embodiments, if the score exceeds some threshold value, then the events will be deemed "similar".

The method 711 may continue on to block 741 with receiving a designation (e.g., from a GUI operated by an end user) indicating that the new event resolution path is now to be considered as a resolution sequence for an expected event. In this way, an event resolution path can be designated as a "resolution sequence", transforming an unexpected event into an expected event.

In some embodiments then, the method 711 may include, at block 745, receiving recommendations selected from search results, and adding the recommendations to prior recommendations to form a combined list at block 749. The method 711 may go on to block 753 with saving the combined list as a group of future recommendations—these future recommendations may be displayed to an end user when the next similar unexpected event occurs.

It should be noted that these methods 611, 711 are but two examples of how various embodiments described herein can operate, and they are given for purposes of illustration, and not limitation. Thus, many embodiments may be realized.

Those of ordinary skill in the art will realize that each of the method elements shown in FIG. 7 may be added to or substituted for any of the method elements shown in FIG. 6. Additionally, those of ordinary skill in the art will also realize that each of the method elements of FIGS. 6-7 may be combined with the others in a variety of ways, to form a variety of methods that use the elements from each of the figures in serial, parallel, looped, and/or repetitious fashion.

Figure 8:
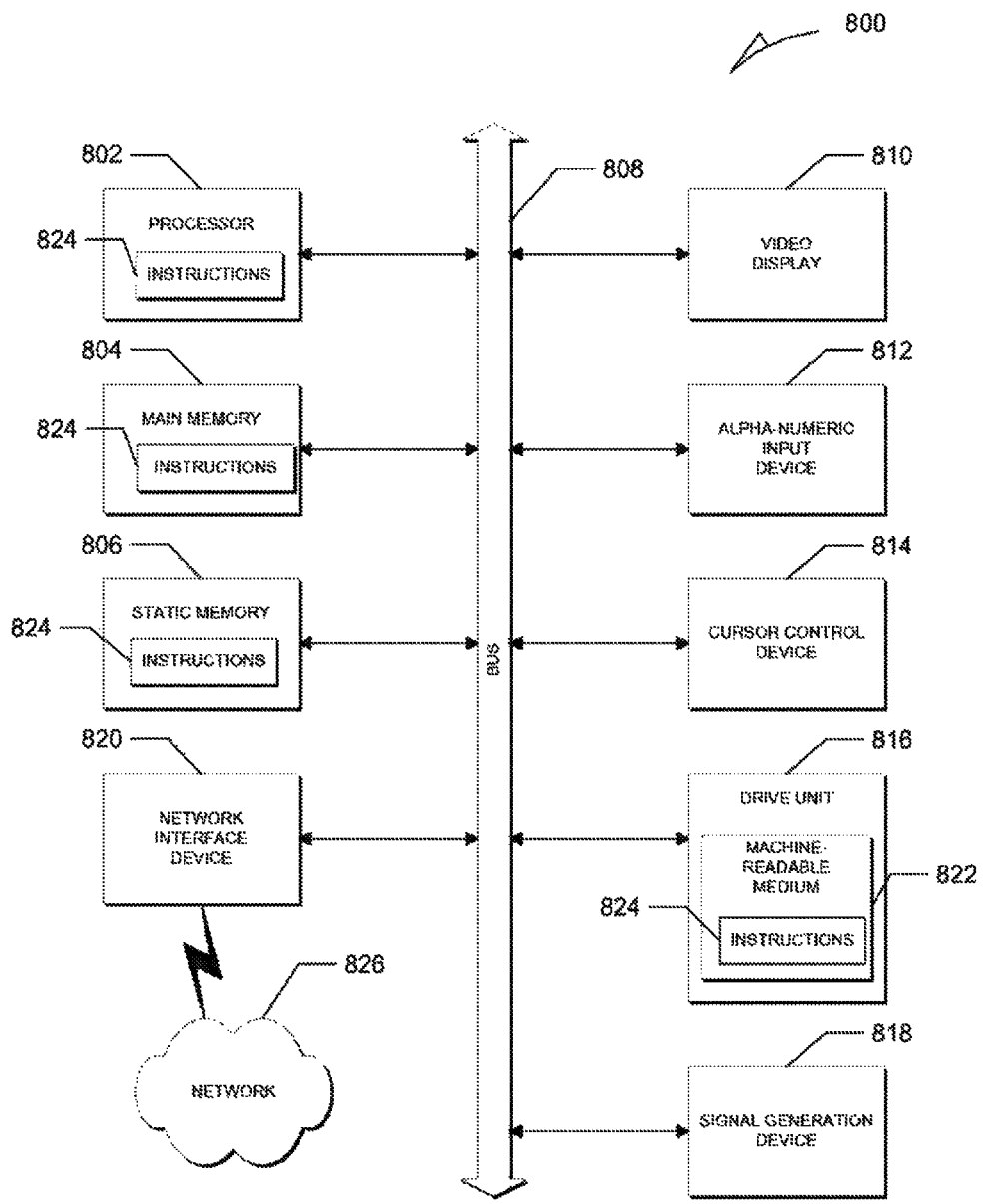
FIG. 8 is a block diagram of a machine in the example form of a computer system according to various embodiments of the invention.

FIG. 8 is a block diagram of a machine in the example form of a computer system 800 according to various embodiments of the invention. The system 800 may include a set of instructions 824 for causing the system 800 to perform any one or more of the methodologies discussed herein, including those illustrated in FIGS. 6-7. The system 800 may be similar to or identical to the system 500 of FIG. 5.

In some embodiments, the system 800 may operate as a standalone device or may be connected (e.g., networked) to other machines. In a networked deployment, the system 800 may operate in the capacity of a server or a client machine in a server-client network environment, or as a peer machine in a peer-to-peer (or distributed) network environment.

The system 800 may comprise a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example system 800 may include a processor 802 (e.g., a central processing unit (CPU), a graphics processing unit (GPU) or both), a main memory 804 and a static memory 806, all of which communicate with each other via a bus 808. The computer system may further include a video display unit 810 (e.g., liquid crystal displays (LCD) or cathode ray tube (CRT)). The display unit 810 may be used to display a GUI according to the embodiments described with respect to FIGS. 1-4. The system 800 also may include an alphanumeric input device 812 (e.g., a keyboard), a cursor control device 814 (e.g., a mouse), a disk drive unit 816, a signal generation device 818 (e.g., a speaker), and a network interface device 820.

The disk drive unit 816 may include a machine-readable medium 822 on which is stored one or more sets of instructions (e.g., software 824) embodying any one or more of the methodologies or functions described herein. The software 824 may also reside, completely or at least partially, within the main memory 804 and/or within the processor 802 during execution thereof by the computer system 800, the main memory 804 and the processor 802 also constituting machine-readable media. The software 824 may further be transmitted or received over a network 826 via the network interface device 820, which may comprise a wired and/or wireless interface device.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include tangible media that include, but are not limited to, solid-state memories, optical, and magnetic media.

Certain applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information).

In conclusion, it can be seen that the various mechanisms for event resolution presented herein allow workers to respond to events, both expected and unexpected, in a guided fashion. Event resolution can thus be handled more predictably in a variety of desktop contexts, including within call center applications, within applications supporting knowledge workers, as part of business process and event management tools, and others. This may result in more consistent resolution of various event types, as well as increased efficiency. As the base of recommendations grows, workers that employ the mechanisms described herein may also experience increased job satisfaction.

Embodiments of the invention can be implemented in a variety of architectural platforms, operating and server systems, devices, systems, or applications. Any particular architectural layout or implementation presented herein is thus provided for purposes of illustration and comprehension only, and is not intended to limit the various embodiments.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A computer implemented method, comprising:
using one or more processors to perform at least a portion of one or more of the following:
detecting by an alert system executed by the one or more processors occurrence of an alert event;
determining by a dispatcher executed by the one or more processors whether the alert event is an expected event or an unexpected event, wherein the expected event corresponds to an event previously associated with a resolution sequence and the unexpected event is not associated with any pre-existing resolution sequence;
presenting by a guided procedure module executed by the one or more processors the resolution sequence for the expected event;
soliciting by a graphical user interface executed by the one or more processors a new event resolution path for the unexpected event;
determining search results for a user in response to a search query for information for resolving the unexpected event;
dynamically determining a context of the unexpected event, based at least in part on a user request to save one or more of the search results to the context of the unexpected event;
determining a list of recommended actions associated with at least one prior event determined to be similar to the context of the unexpected event;
ranking the list based on a matching degree between the context of the unexpected event and a previously stored context of the at least one prior event;
receiving user ratings of at least one of the recommended actions, wherein the user ratings are stored within the context of the unexpected event; and
weighting the ranking of the list of recommended actions, based on the user ratings of at least one of the recommended actions.

2. The method of claim 1, wherein detecting the occurrence comprises:
detecting a value of a received event; and
at least one of comparing the value to a pre-selected alert threshold value or comparing the received event to one of a correlated series of events.

3. The method of claim 1, wherein presenting the resolution sequence further comprises:
initiating the resolution sequence as a previously-stored guided procedure.

4. The method of claim 1, wherein soliciting the new event resolution path comprises:
receiving, from a user notified of the alert event, a new recommendation to resolve the alert event.

5. The method of claim 1, comprising:
adding a new recommendation received from a user notified of the alert event to form a portion of the new event resolution path.

6. The method of claim 1, comprising:
storing the new event resolution path; and
recalling the new event resolution path upon determining a new event is similar to the alert event.

7. The method of claim 1, wherein the alert event is associated with an alert type, comprising:
sending an alert message to alerted users assigned to the alert type.

8. The method of claim 1, comprising:
defining a rule to handle the expected event, wherein the rule includes a valid time period and a process to initiate as part of presenting the resolution sequence.

9. A computer implemented method, comprising:
using one or more processors to perform at least a portion of one or more of the following:
determining by a dispatcher executed by the one or more processors an alert event is an unexpected event, wherein the unexpected event is not associated with any pre-existing resolution sequence;
displaying by a display an alert message associated with the unexpected event;
soliciting by a graphical user interface executed by the one or more processors recommendations to form a new event resolution path to be presented upon determining a new event has occurred that is similar to the alert event;
determining search results for a user in response to a search query for information for resolving the unexpected event;
dynamically determining the context of the unexpected event, based at least in part on a user request to save one or more of the search results to the context of the unexpected event;
determining a list of recommended actions associated with at least one prior event determined to be similar to the context of the unexpected event;
ranking the list based on a matching degree between the context of the alert event and a previously stored context of the at least one prior event;
receiving user ratings of at least one of the recommended actions, wherein the user ratings are stored within the context of the unexpected event; and
weighting the ranking of the list of recommended actions, based on the user ratings of at least one of the recommended actions.

10. The method of claim 9, wherein displaying the alert message comprises:
at least one of displaying a web page window or a sidebar window as part of a graphical user interface.

11. The method of claim 9, comprising:
receiving a designation indicating the new event resolution path is a resolution sequence for an expected event.

12. The method of claim 9, comprising:
selecting a system to provide the alert event.

13. The method of claim 9, comprising:
receiving the recommendations selected from the search results;
adding the recommendations to the list of recommended actions to form a combined list; and
saving the combined list as a group of future recommendations.

14. A non-transitory computer readable medium having instructions stored therein for causing a computer to implement a method, comprising:
detecting occurrence of an alert event;
determining whether the alert event is an expected event or an unexpected event, wherein the expected event corresponds to an event previously associated with a resolution sequence and the unexpected event is not associated with any pre-existing resolution sequence;
presenting the resolution sequence for the expected event;
soliciting a new event resolution path for the unexpected event;
determining search results for a user in response to a search query for information for resolving the unexpected event;
dynamically determining a context of the unexpected event, based at least in part on a user request to save one or more of the search results to the context of the unexpected event;
determining a list of recommended actions associated with at least one prior event determined to be similar to the context of the unexpected event;
ranking the list based on a matching degree between the context of the unexpected event and a previously stored context of the at least one prior event;
receiving user ratings of at least one of the recommended actions, wherein the user ratings are stored within the context of the unexpected event; and
weighting the ranking of the list of recommended actions, based on the user ratings of at least one of the recommended actions.

15. The medium of claim 14, wherein the method comprises:
detecting the occurrence of the alert event by at least one of determining that a received event has crossed a threshold value for an event type matching the event type of the alert event, or by determining that the received event supports a correlated series of events.

16. The medium of claim 14, wherein the method comprises:
presenting the resolution sequence or soliciting the new event resolution path as part of a graphical user interface.

17. A system, comprising:
one or more processors coupled to a memory;
an alert system executed by the one or more processors to detect occurrence of an alert event;
a dispatcher executed by the one or more processors to determine whether the alert event is an expected event or an unexpected event, wherein the expected event corresponds to an event previously associated with a resolution sequence and the unexpected event is not associated with any pre-existing resolution sequence;
a guided procedure module executed by the one or more processors to present the resolution sequence for the expected event;
a broker module executed by the one or more processors to maintain a relationship between the alert event and a new event resolution path as a context for resolving the unexpected event, the broker module being configured to:
determine search results for a user in response to a search query for information for resolving the unexpected event;
dynamically determine the context of the unexpected event, based at least in part on a user request to save one or more of the search results to the context of the unexpected event;
determine a list of recommended actions associated with at least one prior event determined to be similar to the context of the unexpected event;
rank the list based on a matching degree between the context of the unexpected event and a previously stored context of the at least one prior event;
receive user ratings of at least one of the recommended actions, wherein the user ratings are stored within the context of the unexpected event; and
weight the ranking of the list of recommended actions, based on the user ratings of at least one of the recommended actions.

18. The system of claim 17, comprising:
a display to display a pre-existing series of actions to resolve the expected event as part of the guided procedure, or to dynamically display the new event resolution path as recommendations are selected from the search results and added to the new event resolution path.

19. The system of claim 17, wherein the broker module comprises:
an assistant module to search business intelligence to provide potential recommendations to propose as part of the new event resolution path.

20. The system of claim 17, wherein the broker module comprises:
a recommender module to record user interactions related to recommendations selected to form part of the new event resolution path.

21. The system of claim 17, comprising:
a resource integration layer to access stored information, including a model of the guided procedure.

* * * * *